United States Patent
Catrow

(10) Patent No.: US 10,153,542 B1
(45) Date of Patent: Dec. 11, 2018

(54) MOBILE SATELLITE SYSTEM

(71) Applicant: Paul Catrow, St Clair Shores, MI (US)

(72) Inventor: Paul Catrow, St Clair Shores, MI (US)

( * ) Notice: Subject to any disclaimer, the term of this patent is extended or adjusted under 35 U.S.C. 154(b) by 46 days.

(21) Appl. No.: 15/478,364

(22) Filed: Apr. 4, 2017

(51) Int. Cl.
  *H01Q 1/32* (2006.01)
  *H01Q 1/42* (2006.01)
  *H01Q 15/16* (2006.01)
  *H01Q 3/10* (2006.01)
  *H04B 7/185* (2006.01)

(52) U.S. Cl.
  CPC .............. *H01Q 1/3216* (2013.01); *H01Q 1/42* (2013.01); *H01Q 3/10* (2013.01); *H01Q 15/16* (2013.01); *H04B 7/18517* (2013.01)

(58) Field of Classification Search
  CPC .......... H01Q 1/3216; H01Q 3/10; H01Q 1/42; H04B 7/18517
  USPC ....................................... 343/713
  See application file for complete search history.

(56) References Cited

U.S. PATENT DOCUMENTS

| 4,309,708 | A * | 1/1982 | Sayovitz .............. H01Q 15/162 343/713 |
| 5,528,250 | A | 6/1996 | Sherwood |
| 5,646,638 | A | 7/1997 | Winegard |
| 7,852,274 | B2 * | 12/2010 | Madden, Jr. ......... H01Q 1/1207 343/713 |
| 8,174,461 | B1 * | 5/2012 | Smith .................. H01Q 1/3216 343/713 |
| 8,523,256 | B2 * | 9/2013 | McCoubrey .............. B60P 3/14 296/24.32 |
| 8,593,339 | B2 | 11/2013 | Morana |
| D707,208 | S | 6/2014 | Kirkland |
| 9,118,974 | B2 | 8/2015 | Miller |
| 9,253,816 | B1 | 2/2016 | Gashette |
| 2008/0158078 | A1 | 7/2008 | Allen |

FOREIGN PATENT DOCUMENTS

WO   2008098121 A1   8/2008

* cited by examiner

*Primary Examiner* — Brian Young
(74) *Attorney, Agent, or Firm* — Kyle A. Fletcher, Esq.

(57) ABSTRACT

The mobile satellite system is a vehicle that is adapted for use in satellite communications. The mobile satellite system is a trailer that is towed by a motorized vehicle. The mobile satellite system comprises a dish, a dish mount, a chassis, a suspension, a plurality of tracks, and a control system. The suspension attaches the plurality of tracks to the chassis. The dish mount attaches the dish to the chassis. The control system is mounted in the chassis. The dish is an antenna that is used to establish a communication link with a targeted satellite. The control system is an electronic device. The control system: 1) manages the targeting and positioning of the dish; and, 2) receives messages and other communications from a targeted satellite; and, optionally, 3) transmits messages and other communications to the targeted satellite.

19 Claims, 5 Drawing Sheets

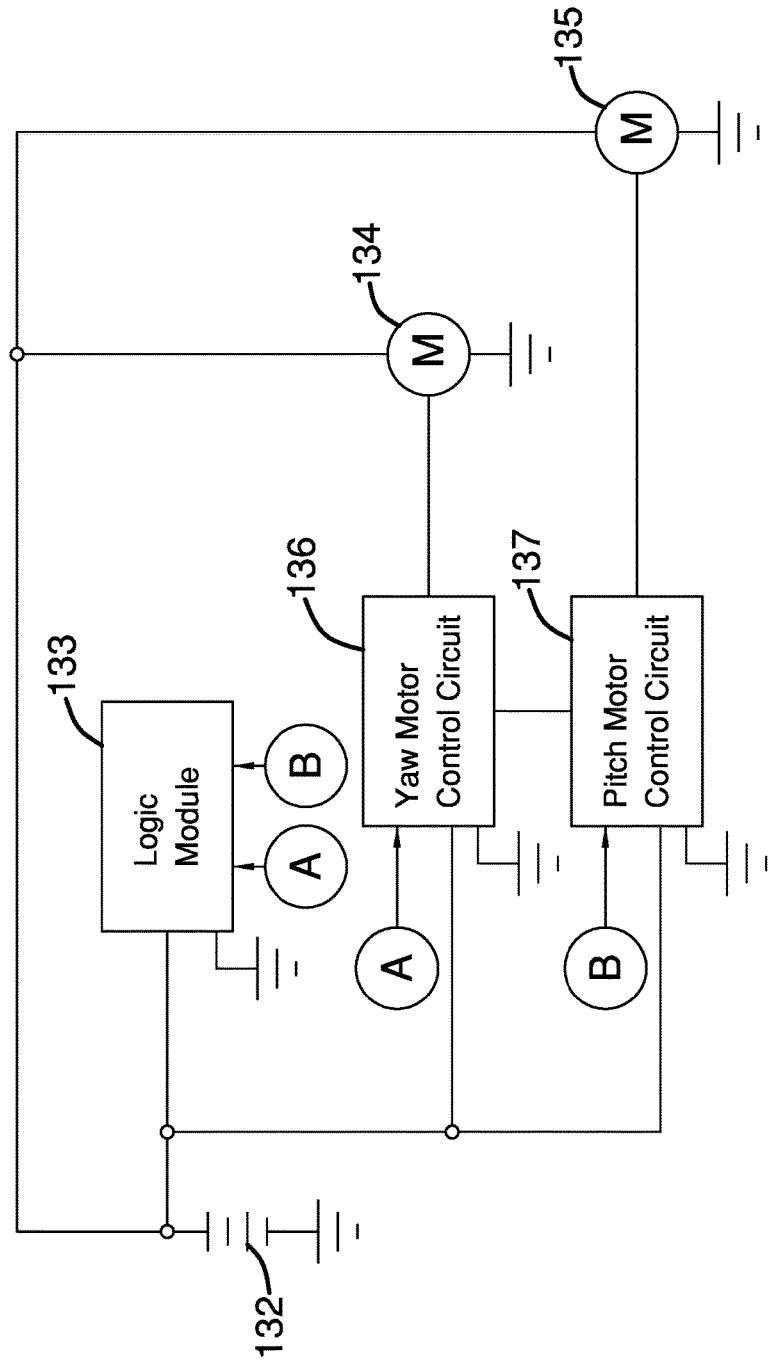

MOBILE SATELLITE SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of electricity and electric communication techniques including transmission, more specifically, a radio transmission system.

SUMMARY OF INVENTION

The mobile satellite system is a vehicle that is adapted for use in satellite communications. The mobile satellite system is a trailer that is towed by a motorized vehicle. The mobile satellite system comprises a dish, a dish mount, a chassis, a suspension, a plurality of tracks, and a control system. The suspension attaches the plurality of tracks to the chassis. The dish mount attaches the dish to the chassis. The control system is mounted in the chassis. The dish is an antenna that is used to establish a communication link with a targeted satellite. The control system is an electronic device. The control system: 1) manages the targeting and positioning of the dish; and, 2) receives messages and other communications from a targeted satellite; and, optionally, 3) transmits messages and other communications to the targeted satellite.

These together with additional objects, features and advantages of the mobile satellite system will be readily apparent to those of ordinary skill in the art upon reading the following detailed description of the presently preferred, but nonetheless illustrative, embodiments when taken in conjunction with the accompanying drawings.

In this respect, before explaining the current embodiments of the mobile satellite system in detail, it is to be understood that the mobile satellite system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the mobile satellite system.

It is therefore important that the claims be regarded as including such equivalent construction insofar as they do not depart from the spirit and scope of the mobile satellite system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 5 is a block diagram of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
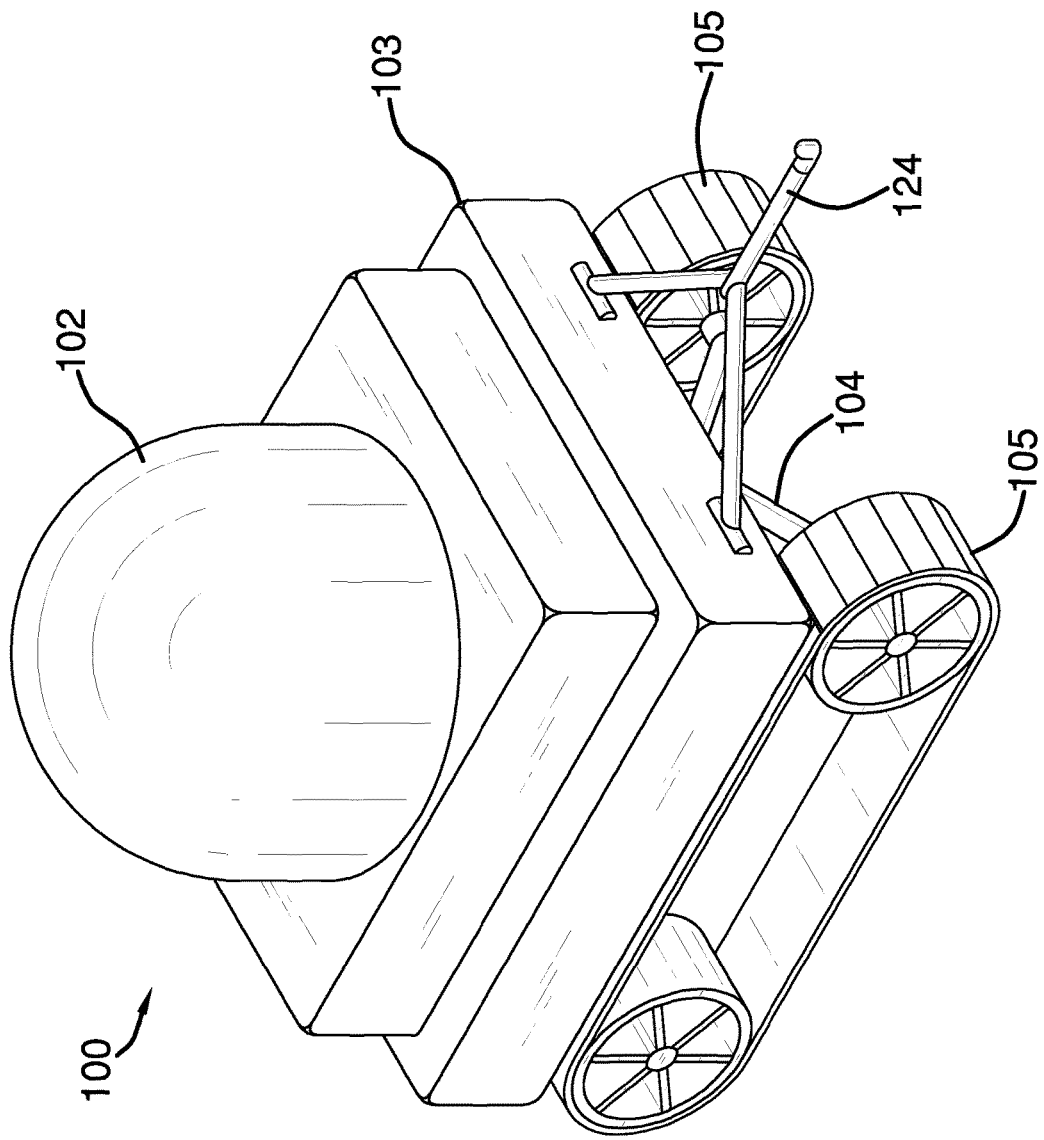
FIG. 1 is a perspective view of an embodiment of the disclosure.
Figure 2:
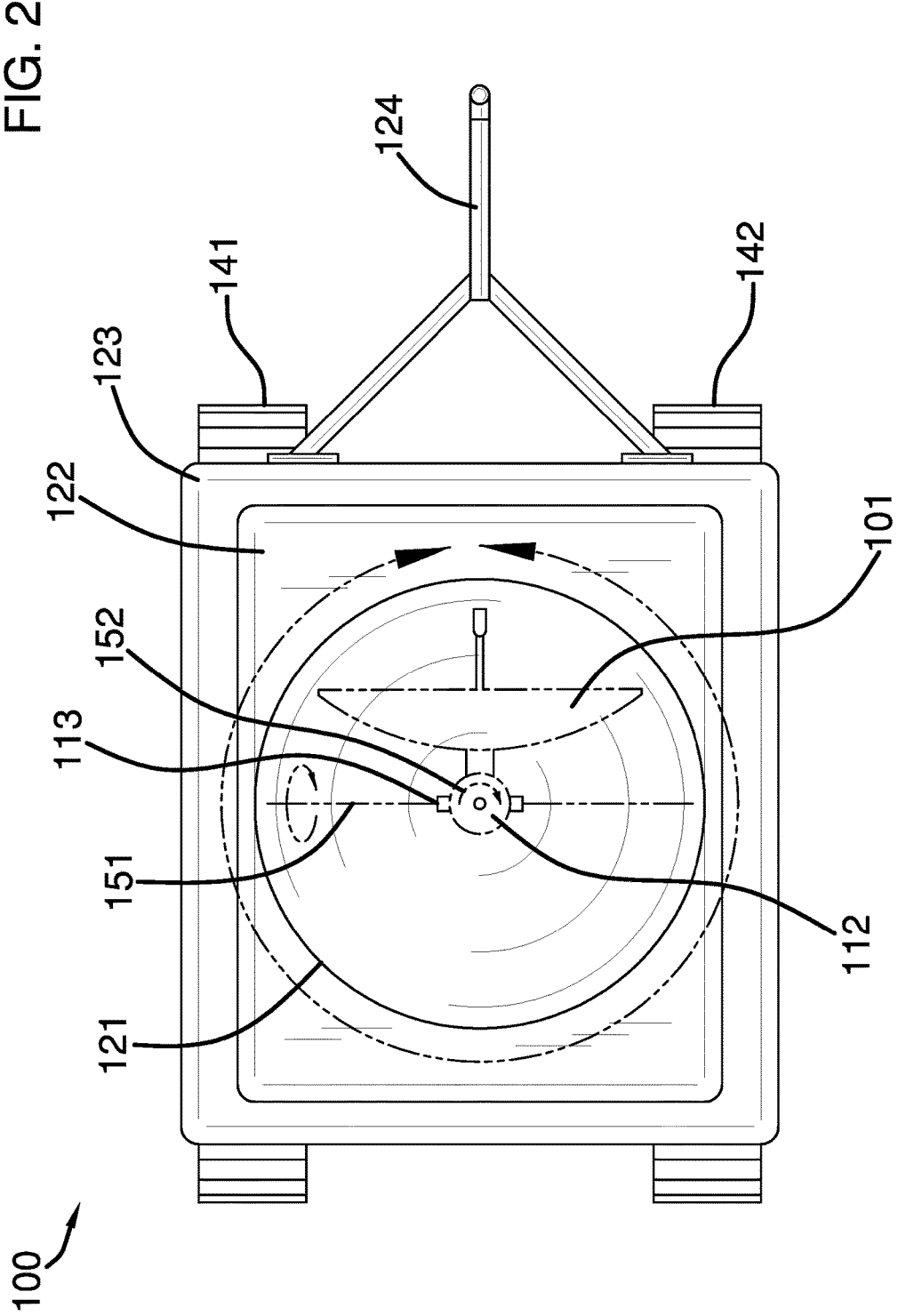
FIG. 2 is a top view of an embodiment of the disclosure.
Figure 3:
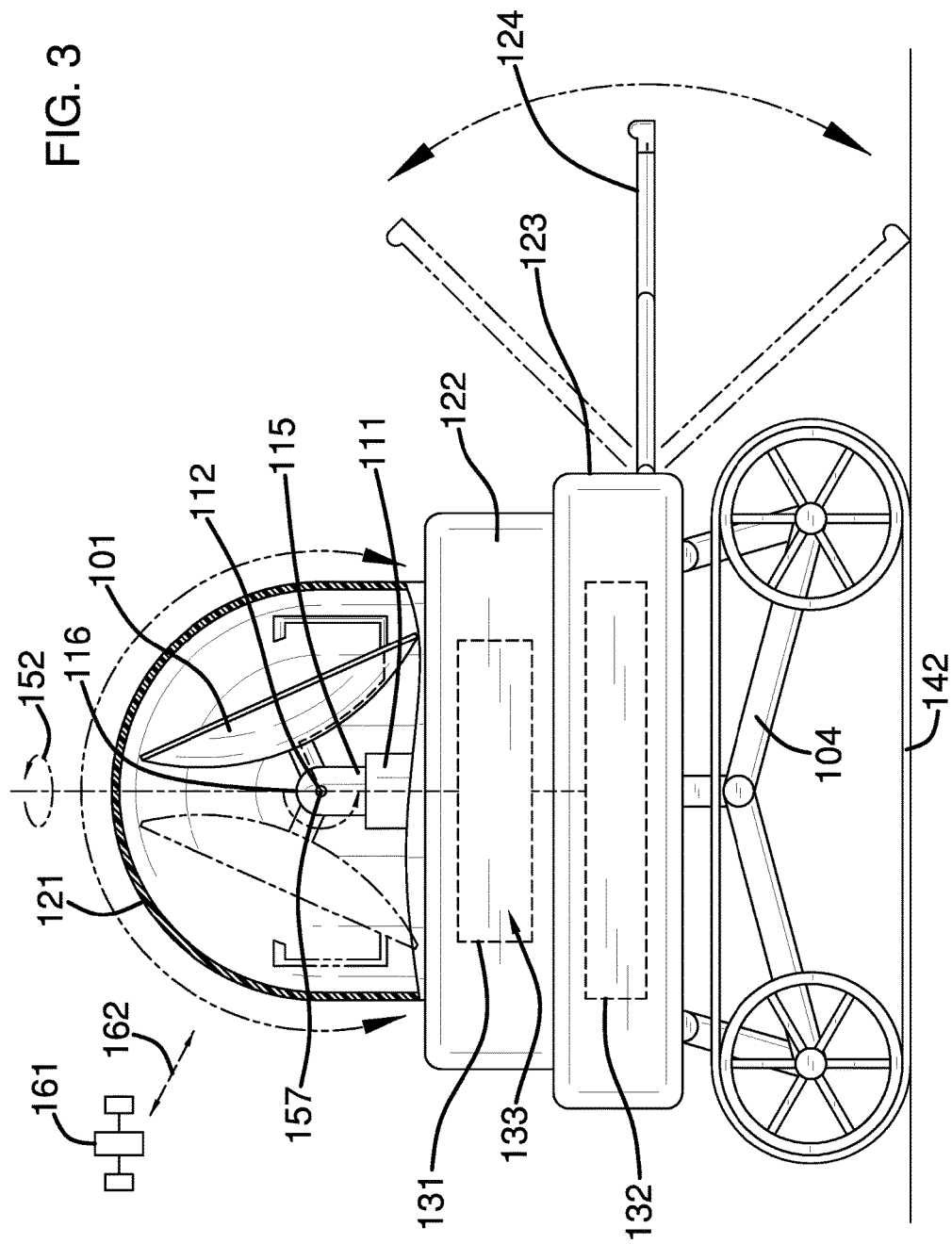
FIG. 3 is a side view of an embodiment of the disclosure.
Figure 4:
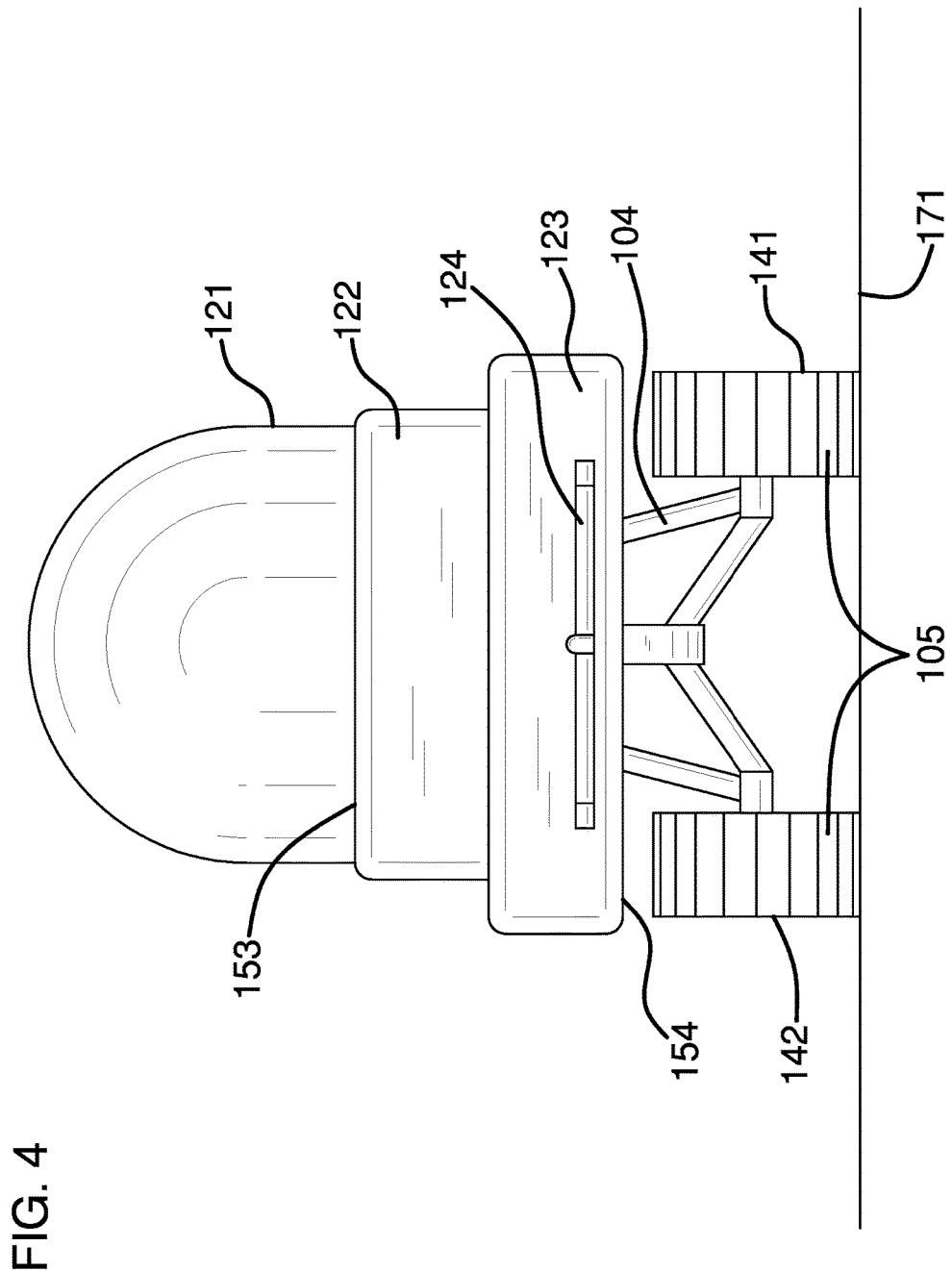
FIG. 4 is a front view of an embodiment of the disclosure.

Detailed reference will now be made to one or more potential embodiments of the disclosure, which are illustrated in FIGS. 1 through 5.

The mobile satellite system 100 (hereinafter invention) is a vehicle that is configured for use in satellite communication applications. The invention 100 is a trailer that is towed by a motorized vehicle. The invention 100 comprises a dish 101, a dish 101 mount 102, a chassis 103, a suspension 104, a plurality of tracks 105, and a control system 106. The suspension 104 attaches the plurality of tracks 105 to the chassis 103. The dish 101 mount 102 attaches the dish 101 to the chassis 103. The control system 106 is mounted in the chassis 103. The dish 101 is an antenna that is used to establish a communication link 162 with a targeted satellite 161. The control system 106 is an electronic device. The control system 106: 1) manages the targeting and positioning of the dish 101; 2) receives messages and other communications through the communication link 162 with a targeted satellite 161; and, optionally, 3) transmits messages and other communications through the communication link 162 with the targeted satellite 161. The targeted satellite 161 is a communication satellite with which the transceiver 131 establishes a communication link 162. The communication link 162 refers to the establishment of a protocol between the transceiver 131 and the targeted satellite 161 such that a message or other communication can be exchanged between the transceiver 131 and the targeted satellite 161.

The dish 101 is a parabolic antenna that is used to transmit and receive electromagnetic signals between the control system 106 and the targeted satellite 161. The design and use of parabolic antennae are well known and documented in the telecommunication arts.

The dish 101 mount 102 is an apparatus that attaches the dish 101 to the chassis 103. The dish 101 mount 102 incorporates the hardware required to rotate the dish 101 around both the pitch axis 151 and the spin axis 152 such that the dish 101 can be aimed at the targeted satellite 161. The dish 101 mount 102 comprises a slewing bearing 111, a stanchion 112, and a pitch bearing 113. The stanchion 112 is further defined with a first end 115 and a second end 116.

The slewing bearing 111 is a readily and commercially available bearing which rotates the dish 101 around the spin axis 152. The stanchion 112 is a structure that raises the dish 101 above the superior surface 153 of the chassis 103. The pitch bearing 113 comprises one or more readily and commercially available bearings that are used to rotate the dish 101 around the pitch axis 151. The first end 115 of the stanchion 112 attaches to the slewing bearing 111 such that the slewing bearing 111 rotates the stanchion 112 around its center axis. The second end 116 of the stanchion 112 attaches to the pitch bearing 113.

The chassis 103 is a housing that forms the foundation of the invention 100. The chassis 103 is formed with any apertures necessary to implement any potential embodiments of the disclosure. The chassis 103 comprises a radome 121, a transceiver chamber 122, a battery chamber 123, and a trailer hitch 124. The chassis 103 is further defined with a pitch axis 151, a spin axis 152, a superior surface 153, and an inferior surface 154.

The radome 121 is a semicircular dome structure that is used to enclose the dish 101. The radome 121 is a commercially available product. The transceiver chamber 122 is a hollow rectangular block structure. The transceiver chamber 122 is sized to contain the transceiver 131, the logic module 133, the yaw motor control 136, and the pitch motor control 137. The battery chamber 123 is a hollow rectangular block structure. The battery chamber 123 is sized to contain the battery 132.

In the first potential embodiment of the disclosure, the outer dimensions of the transceiver chamber 122 are lesser than the outer dimensions of the battery chamber 123 such that the transceiver chamber 122 can be placed upon the superior face of the battery chamber 123 in the manner of a conical plate. The superior surface 153 of the chassis 103 is the face of the transceiver chamber 122 that is distal from the plurality of tracks 105. The inferior surface 154 of the chassis 103 is the face of the battery chamber 123 that is proximal to the plurality of tracks 105.

The trailer hitch 124 is a readily and commercially available fastening apparatus that is used to attach the invention 100 to a motorized vehicle such that the motorized vehicle can tow the invention 100.

The slewing bearing 111 is mounted on the superior surface 153 of the chassis 103.

The suspension 104 is a structural apparatus that attaches the plurality of tracks 105 to the chassis 103. The suspension 104 attaches to the inferior surface 154 of the chassis 103. Methods to design and manufacture a suspension 104 are well known and documented in the mechanical arts.

Each of the plurality of tracks 105 is a continuous track that is used to support the chassis 103 on a supporting surface 171. The plurality of tracks 105 comprises a first track 141, and a second track 142. The first track 141 is a continuous track that is used to support the suspension 104 and chassis 103 above a supporting surface 171. The second track 142 is a continuous track that is used to support the suspension 104 and chassis 103 above a supporting surface 171. The second track 142 is parallel to the first track 141.

The control system 106 is an electrical system that is used to: 1) aim the dish 101 at a targeted satellite 161; 2) receive a message or other communication from the targeted satellite 161; and, optionally, 3) transmit a message or other communication to the targeted satellite 161. The control system 106 comprises a transceiver 131, a battery 132, a logic module 133, a yaw motor 134, and a pitch motor 135. The yaw motor 134 further comprises a yaw motor control 136. The pitch motor 135 further comprises a pitch motor control 137.

The transceiver 131 is a commercially available electronic device that: 1) receives a message or other communication from the targeted satellite 161; and, optionally, 2) transmits a message or other communication to the targeted satellite 161.

In the first potential embodiment of the disclosure, the transceiver 131 is selected such that the transceiver 131 will receive and decode any encryption associated with the message or other communication transmitted by the targeted satellite 161. In a second potential embodiment of the disclosure, the transceiver 131 is selected such that the transceiver 131 will further encode and transmit a message or other communication that will be received by the targeted satellite 161.

The battery 132 is a commercially available chemical device that converts chemical potential energy into electrical energy that is used to power the electrical components of the control system 106.

The logic module 133 is a readily and commercially available programmable electronic device that is used to control the aiming of the dish 101 at the targeted satellite 161.

The pitch motor 135 is an electric motor that is used to rotate the dish 101 around the pitch axis 151. The pitch axis 151 is a first axis around which the dish 101 is rotated in order to aim the dish 101 at the targeted satellite 161. Methods to mount motors to control spin around an axis are well known in the electrical and mechanical arts. The pitch motor control 137 is a motor control circuit that is associated with the pitch motor 135. The pitch motor control 137 controls the angular position of the dish 101 around the pitch axis 151 based on control signals received from the logic module 133.

The yaw motor 134 is an electric motor that is used to rotate the stanchion 112 around the spin axis 152. The spin axis 152 is a second axis around which the dish 101 is rotated in order to aim the dish 101 at the targeted satellite 161. The yaw motor control 136 is a motor control circuit that is associated with the yaw motor 134. The yaw motor control 136 controls the angular position of the stanchion 112 around the spin axis 152 based on control signals received from the logic module 133.

The pitch axis 151 and the spin axis 152 are discussed in greater detail elsewhere in this disclosure.

Methods to use a logic module 133 to provide control signals to motor control circuits are well known and documented in the electrical arts.

The following definitions were used in this disclosure:

Battery: As used in this disclosure, a battery is a container consisting of one or more cells, in which chemical energy is converted into electricity and used as a source of power.

Bearing: As used in this disclosure, a bearing is a mechanical device that: 1) guides and limits the motion of a moving component relative to a fixed component; and, 2) reduces the friction between the moving component and the fixed component. The use of bearings is well known and documented in the mechanical arts.

Conical Plate: As used in this disclosure, a conical plate is a structure that is formed from a plurality of plates. Each plate selected from the plurality of plates is differentiated from plates remaining in the plurality of plates by the span of the diameter of the plate of the selected plate compared to the span of the corresponding diameter of the remaining plates in the plurality of plates. The plurality of plates are stacked upon each other such that: 1) the centers of each of the plurality of plates are aligned such these centers form a line that is perpendicular to the supporting surface upon which the plurality of plates are stacked; 2) the plurality of plates are stacked in a decreasing order based of the span of the diameter of the plate; 3) the plurality of plates are stacked such that the plate with the maximum span of the diameter of the plate is proximal to the supporting surface; and, 4) the plurality of plates are stacked such that the plate with the minimum span of the diameter of the plate is distal from the supporting surface. A conical plate formed from a plurality of circular disks is commonly seen and often referred to as a Tower of Hanoi.

Continuous track: As used in this disclosure, the term continuous track refers to a continuous loop of treads that are used to provide traction a vehicle. The treads are attached to form the continuous loop using a pivot. The use of the pivot allows the plane formed by a first tread to rotate relative to the plane formed by an adjacent tread as the two treads are rotated around the continuous loop. The continuous track is generally wrapped around two or more wheels which are used to guide the continuous track through the continuous loop. For a motorized vehicle, the two or more wheels are mechanically rotated such that the rotation of the two or more wheels rotates the continuous track and propel the motorized vehicle. The main advantages of a continuous track relative to wheels are: 1) the continuous track will provide better traction; and, 2) the greater surface area of the continuous track relative to the wheels creates a load path the exerts less pressure on the supporting surface relative to wheels. Regularly seen vehicles that commonly use (a pair of) continuous track include, but are not limited to, military vehicles, heavy construction equipment, and mobile robotic devices. The continuous track is commonly referred to as a tank tread.

Control System: As used in this disclosure, a control system is a first device or system that manages and regulates the behavior or operation of a second device or system.

Electric Motor: In this disclosure, an electric motor is a machine that converts electric energy into rotational mechanical energy.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Housing: As used in this disclosure, a housing is a rigid casing that encloses and protects one or more devices.

Hitch: As used in this disclosure, a hitch is a fastening apparatus that attaches an unpowered vehicle to a motorized vehicle such that the motorized vehicle can tow the unmotorized vehicle.

Inferior: As used in this disclosure, the term inferior refers to a directional reference that is parallel to and in the same direction as the force of gravity.

Load Path: As used in this disclosure, a load path refers to a chain of one or more structures that transfers a load generated by a raised structure or object to a foundation or the earth.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Pitch: As used in this disclosure, the term pitch refers to the rotation or oscillation of a vehicle around the lateral axis of a vehicle. When a vehicle is resting in a normal position on a level surface, the lateral axis is defined as the axis that: 1) is perpendicular to the roll axis; and, 2) is parallel to the level surface. In this definition, the level surface is strictly a reference in the sense that the definition of the lateral axis remains unchanged should the surface change. The lateral axis is also commonly referred to as the pitch axis. More colloquially, pitch would be referred to a moving the nose of the vehicle up or down.

Rectangular Block: As used in this disclosure, a rectangular block refers to a three dimensional structure comprising six rectangular surfaces formed at right angles. Within this disclosure, a rectangular block may further comprise rounded edges and corners.

Roll: As used in this disclosure, the term roll refers to a rotation or oscillation of a vehicle around the axis of the vehicle that is defined by the nominal direction of travel of the vehicle. This described axis is commonly referred to as the roll axis or the longitudinal axis. By nominal direction of travel of the vehicle is meant the anticipated forward or backward direction of a vehicle or, more colloquially, the direction the front of the vehicle is going. An example of a difference between the nominal direction of travel and actual direction of travel occurs with aircraft in a heavy cross wind. In this situation, the actual direction of travel of the aircraft will not align with the longitudinal axis.

Slewing Bearing: As used in this disclosure, a slewing bearing is a device that is used to rotate an object on a horizontal surface. Slewing bearings are often called turntable bearings or a lazy Susan bearing.

Superior: As used in this disclosure, the term superior refers to a directional reference that is parallel to and in the opposite direction of the force of gravity.

Supporting Surface: As used in this disclosure, a supporting surface is a horizontal surface upon which an object is placed. Within this disclosure, it is assumed that the object is placed on the supporting surface in an orientation that is appropriate for the normal or anticipated use of the object.

Tow: As used in this disclosure, the term tow is used as a verb that refers to moving an object by pulling on the object with the assistance of an apparatus or device.

Trailer: As used in this disclosure, a trailer is an unpowered vehicle that is towed by a powered vehicle.

Transceiver: As used in this disclosure, a transceiver is a device that is used to transmit and receive radio signals.

Vehicle: As used in this disclosure, a vehicle is a device that is used for transporting passengers, goods, or equipment. The term motorized vehicle refers to a vehicle can move under power provided by an electric motor or an internal combustion engine.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Yaw: As used in this disclosure, the term yaw refers to the rotation or oscillation of a vehicle around the perpendicular axis of a vehicle. The perpendicular axis is defined as the axis that: 1) is perpendicular to the roll axis; and, 2) perpendicular to the pitch axis. The perpendicular axis is also commonly referred to as the yaw axis or the spin axis. More colloquially, yaw would be referred to as a spin.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A mobile radio communication system comprising:
a dish, a dish mount, a chassis, a suspension, a plurality of tracks, and a control system;
wherein the suspension attaches the plurality of tracks to the chassis;
wherein the dish mount attaches the dish to the chassis;
wherein the control system is mounted in the chassis;
wherein the dish is an antenna that is used to establish a communication link with a targeted satellite;
wherein the targeted satellite is a communication satellite;
wherein the control system is an electronic device;
wherein the mobile radio communication system is configured for use in satellite communication;
wherein the mobile radio communication system is a trailer;
wherein the mobile radio communication system that is towed;
wherein the control system manages the aiming and positioning of the dish towards the targeted satellite;
wherein the control system receives messages and other communication through a communication link with the targeted satellite;
wherein the communication link refers to the establishment of a protocol between the transceiver and the targeted satellite such that a message and other communication can be exchanged between the control system and the targeted satellite.

2. The mobile radio communication system according to claim 1 wherein the dish is a parabolic antenna that is aimed at the targeted satellite.

3. The mobile radio communication system according to claim 2
wherein the dish mount is an apparatus that attaches the dish to the chassis;
wherein the dish mount incorporates the hardware required to rotate the dish around both a pitch axis and a spin axis such that the dish can be aimed at the targeted satellite.

4. The mobile radio communication system according to claim 3
wherein the dish mount comprises a slewing bearing, a stanchion, and a pitch bearing;
wherein the stanchion is further defined with a first end and a second end;
wherein the slewing bearing is a bearing which rotates the dish around the spin axis;
wherein the stanchion is a structure that raises the dish above a superior surface of the chassis;
wherein the pitch bearing comprises one or more bearings that are used to rotate the dish around the pitch axis;
wherein the first end of the stanchion attaches to the slewing bearing such that the slewing bearing rotates the stanchion around its center axis;
wherein the second end of the stanchion attaches to the pitch bearing.

5. The mobile radio communication system according to claim 4
wherein the chassis is a housing;
wherein the chassis comprises a radome, a transceiver chamber, a battery chamber, and a trailer hitch;
wherein the chassis is further defined with the pitch axis, the spin axis, the superior surface, and an inferior surface;
wherein the radome is a semicircular dome structure that is used to enclose the dish;
wherein the transceiver chamber is a hollow rectangular block structure;
wherein the battery chamber is a hollow rectangular block structure;
wherein the superior surface of the chassis is the face of the transceiver chamber that is distal from the plurality of tracks;
wherein the inferior surface of the chassis is the face of the battery chamber that is proximal to the plurality of tracks;
wherein the trailer hitch is a fastening apparatus that attaches the mobile radio communication system to an external device that tows the mobile radio communication system.

6. The mobile radio communication system according to claim 5 wherein the slewing bearing is mounted on the superior surface of the chassis.

7. The mobile radio communication system according to claim 6
wherein the suspension is a structural apparatus that attaches the plurality of tracks to the chassis;
wherein the suspension attaches to the inferior surface of the chassis.

8. The mobile radio communication system according to claim 7 wherein each of the plurality of tracks is a continuous track that is used to support the chassis on a supporting surface.

9. The mobile radio communication system according to claim 8 wherein the control system is an electrical system;
wherein the control system aims the dish at a targeted satellite;
wherein the control system receives the messages and other communications from the targeted satellite.

10. The mobile radio communication system according to claim 9
wherein the control system comprises a transceiver, a battery, a logic module, a yaw motor, and a pitch motor;
wherein the yaw motor further comprises a yaw motor control;
wherein the pitch motor further comprises a pitch motor control;
wherein the transceiver, the battery, the logic module, the yaw motor, the pitch motor, the yaw motor control, and the pitch motor control are electrically interconnected.

11. The mobile radio communication system according to claim 10 wherein the transceiver receives and decodes any encryption associated with the messages and other communication transmitted by the targeted satellite.

12. The mobile radio communication system according to claim 11
wherein the battery is a that converts chemical potential energy into electrical energy that is used to power the electrical components of the control system;
wherein the transceiver chamber is sized to contain the transceiver, the logic module, the yaw motor control, and the pitch motor control;
wherein the battery chamber is sized to contain the battery.

13. The mobile radio communication system according to claim 12
wherein the logic module is a programmable electronic device that is used to control the aiming of the dish at the targeted satellite;
wherein the pitch motor is an electric motor that is used to rotate the dish around the pitch axis;
wherein the pitch axis is a first axis around which the dish is rotated in order to aim the dish at the targeted satellite;
wherein the pitch motor control is a motor control circuit that is associated with the pitch motor;
wherein the pitch motor control controls the angular position of the dish around the pitch axis based on a first set of control signals received from the logic module;
wherein the yaw motor is an electric motor that is used to rotate the stanchion around the spin axis;
wherein the spin axis is a second axis around which the dish is rotated in order to aim the dish at the targeted satellite;
wherein the yaw motor control is a motor control circuit that is associated with the yaw motor;
wherein the yaw motor control controls the angular position of the stanchion around the spin axis based on second set of control signals received from the logic module.

14. The mobile radio communication system according to claim 13 wherein the outer dimensions of the transceiver chamber are lesser than the outer dimensions of the battery chamber such that the transceiver chamber can be placed upon the superior face of the battery chamber in the manner of a conical plate.

15. The mobile radio communication system according to claim 14
wherein the plurality of tracks comprises a first track, and a second track;
wherein the first track is a continuous track;
wherein the second track is a continuous track;
wherein the second track is parallel to the first track.

16. The mobile radio communication system according to claim 13 wherein the control system transmits messages and other communications through the communication link with the targeted satellite.

17. The mobile radio communication system according to claim 16 wherein the transceiver encodes and transmits any messages and other communications received by the targeted satellite.

18. The mobile radio communication system according to claim 17 wherein the outer dimensions of the transceiver chamber are lesser than the outer dimensions of the battery chamber such that the transceiver chamber can be placed upon the superior face of the battery chamber in the manner of a conical plate.

19. The mobile radio communication system according to claim 18
wherein the plurality of tracks comprises a first track, and a second track;
wherein the first track is a continuous track;
wherein the second track is a continuous track;
wherein the second track is parallel to the first track.

* * * * *